April 18, 1950

H. F. SCHMIDT ET AL
RETRACTABLE LANDING GEAR WITH
AN AUTOMATIC DOWN-LATCH 2,504,458

Filed Dec. 24, 1946

INVENTORS
Howard F. Schmidt
& Paul L. Brady
BY
Thomas P. Mahoney

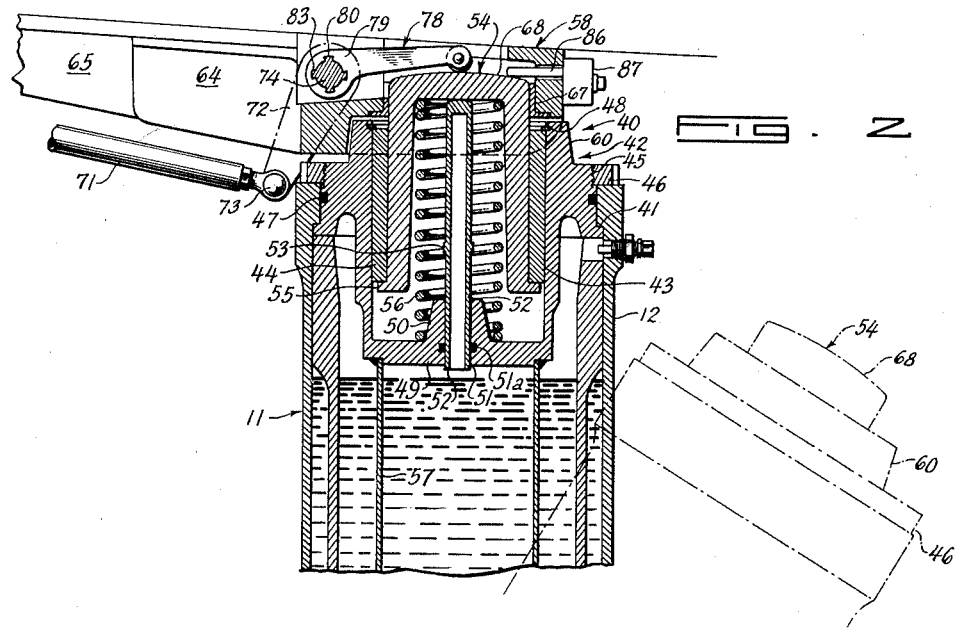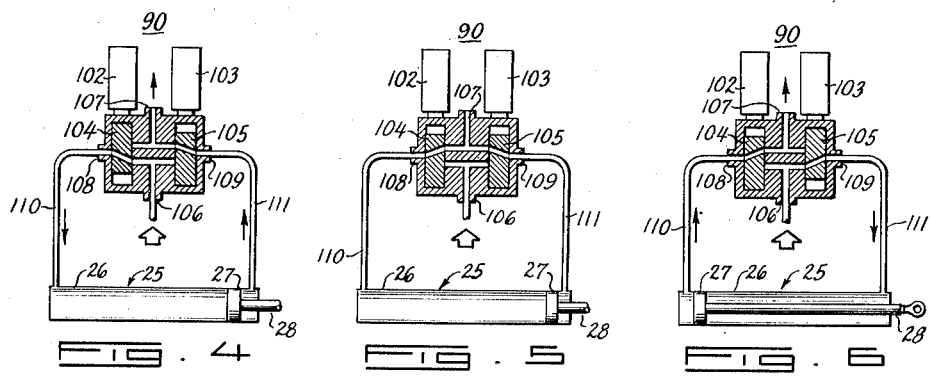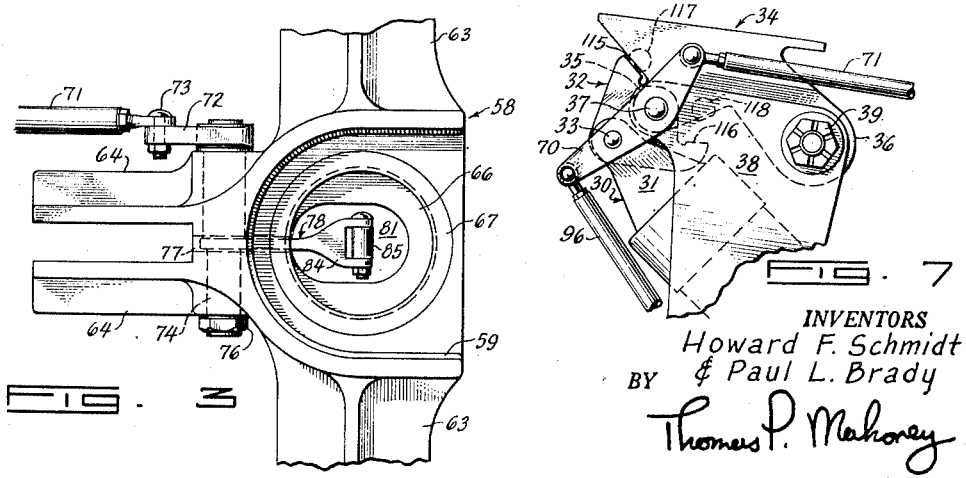

Patented Apr. 18, 1950

2,504,458

UNITED STATES PATENT OFFICE 2,504,458

RETRACTABLE LANDING GEAR WITH AN AUTOMATIC DOWN-LATCH

Howard F. Schmidt and Paul L. Brady, San Diego, Calif., assignors to Consolidated Vultee Aircraft Corporation, San Diego, Calif., a corporation of Delaware Application December 24, 1946, Serial No. 718,154

20 Claims. (Cl. 244—102)

1

This invention relates to improvements in retractable landing gear for aircraft and more particularly to a landing gear which has embodied therein automatic down-latch means adapted to prevent the inadvertent retraction of the gear when the airplane in which it is embodied is in contact with the ground.

In the past there have been incorporated in retractable landing gear mechanisms down-latch means adapted to secure the gear in its extended position so that inadvertent release of the pressure in the hydraulic jack extension mechanism would not cause the collapse of the gear.

Such latches have been automatic in the sense that they became operative immediately upon the extension of the gear but have been subject to being unlatched, as was necessary, by the voluntary throwing of a switch or similar device by the pilot to permit the retraction of the gear. Thus, it is possible for the down-latch to be inadvertently released while the plane is on the ground with the gear in the extended position and serious accidents have occurred as a result of landing gear collapse attributable to such inadvertent down-latch inactivation. In addition, failure in the electrical circuit or in the switch associated with the down-latch mechanism may also be a cause of unexpected landing gear collapse.

Therefore, while conventional down-latches have been a safety factor in that they prevented the collapse of the gear due to such causes as failure of the extension mechanism, they have not been foolproof in view of the fact that the very nature of their construction and mode of operation necessitated that they be susceptible of being manually released from the cockpit and this manual release could be performed inadvertently on the ground with resultant possible collapse of the gear.

It is, therefore, one object of the present invention to provide a retractable landing gear having embodied therein down-latch means which cannot be unlocked as long as the aircraft in which the gear is utilized rests upon the ground.

Another object of this invention is the provision of a down-latch mechanism for a retractable landing gear in which the weight of the aircraft upon the gear itself makes it impossible for the latch to be released and the gear retracted while it is in contact with the ground.

A further object of this invention is the provision of a down-latch mechanism for a retractable landing gear which is an integral part of the

2 landing gear oleo and which is activated by the combined oil and air pressure existing within the oleo.

An additional object of this invention is the provision of a down-latch mechanism for a retractable landing gear which is at all times in its extended or operative position and which automatically locks the landing gear in its extended position upon the extension of the landing gear.

Other objects and advantages of the present invention which have not been adverted to above will be made apparent by a perusal of the appended specification and the accompanying drawings, in which:

Figure 1 is a vertical elevational view which shows a landing gear embodying the subject invention in the extended or "gear-down" position and, in phantom, in the retracted or "gear-up" position;

Fig. 1a is a vertical section of a part of landing gear embodying the invention including a hydraulic cylinder containing a shock-absorbing fluid.

Figure 2 is a vertical sectional view showing the details of construction of the landing gear down-latch mechanism with the down-latch mechanism shown in phantom as it would appear during the process of retracting the gear;

Figure 3 is a bottom plan view showing the construction of the pad or receptacle in which the down-latch mechanism is adapted to be seated;

Figure 4 is a schematic showing, in section, of the solenoid actuated pneumatic valve which controls the flow of compressed air to the pneumatic jack which extends or retracts the landing gear, in the position it assumes when the landing gear is being extended;

Figure 5 is a schematic showing, in section, of the solenoid actuated valve when the gear is extended and no air is permitted to pass into the pneumatic jack;

Figure 6 is a schematic showing, in section, of the solenoid actuated valve in the position it assumes when in process of retracting the gear; and Figure 7 is a detail showing the stop or limit mechanism which is associated with the upper end of the pneumatic jack.

There is shown in the drawings (Figure 1) a retractable landing gear 10 which comprises a main oleo or shock absorbing strut 11 consisting of an outer cylinder 12 and an oleo piston rod 13 on the lower portion of which is mounted a wheel and tire assembly 14. Piston rod 13 has associated therewith a piston 13a which rides on a cushion of oil and air which acts as a shock absorbing medium within cylinder 12. The landing gear 10 is shown in the extended or "gear-down" position with the wheel assembly 14 resting upon the surface of the ground, piston rod 13 driven up within cylinder 12, and piston 13a compressing oil and air within cylinder 12.

A scissors linkage 15, which comprises an arm 16 pivotally mounted on a lug 17 protruding from the rear side of the oleo cylinder at its lower end and an arm 18 pivotally mounted on a lug 19 protruding from the lower rear side of oleo piston rod 13 with the opposite ends of arms 16 and 18 pivotally connected at 20, serves to maintain oleo piston rod 13 in a pre-determined axial relationship to outer cylinder 12 and to prevent misalignment of the piston in reference to the cylinder.

The outer cylinder 12 has integrally formed at the forward portion of its circumference a boss 22 which serves as the means of mounting the oleo strut 11 upon the lower ends of V-struts 23 and 24 the upper ends of which are substantially attached to the main aircraft wing or nacelle structure. The oleo strut 11 is pivotally maintained upon the lower ends of V-struts 23 and 24 by means of a bolt or similar fastening means 8, thus permitting the oleo 11 to be moved in an arc about the lower ends of V-struts 23 and 24. Because of this manner of mounting the oleo strut 11, the upper portion of the oleo is capable of being moved freely in relation to the wing or nacelle structure of the aircraft. It is to be understood that a companion set of V-struts (not shown) which join the lower portions of V-struts 23 and 24 are positioned on the other side of oleo 11 and the oleo will also be supported thereupon. The V-struts serve to transmit lateral and longitudinal loads to the main structure of the airplane and permit the elimination of the conventional drag strut.

A pneumatic double-acting piston jack 25 whose operation controls the extension and retraction of oleo strut 11 and its associated wheel assembly 14 comprises a cylinder 26 having embodied therein a piston 27 and a piston rod 28 which extends from the lower end of said cylinder. The extreme lower end of piston rod 28 is pivotally connected to a boss 29 on the forward circumference of the oleo cylinder 12 by means of a bolt or similar fastener 9 which passes through the lower end of said piston rod 28 and boss 29 formed on oleo cylinder 12. The extreme upper end of pneumatic piston cylinder 26 has formed thereupon a clevis 30 which consists of two arms 31. Between the arms 31 is located a wobble or stop plate 32 and a pin or bolt 33 which passes through oppositely disposed orifices in the arms 31 of the clevis 30 also passes through an orifice in the stop plate 32 thus suspending the upper end of pneumatic piston jack 25 from the wobble or stop plate 32.

A fitting 34, which is mounted on the structure of the airplane, has two projecting lobes 35 and 36 depending therefrom. The upper portion of stop or wobble plate 32 is pivotally suspended from lobe 35, as by means of a pin or bolt 37, and thus, through the intermediary stop plate 32 the pneumatic piston jack 25 is mounted on the aircraft structure.

Therefore, when the pneumatic jack 25 is extended, the upward displacement of the cylinder 26 will cause the clockwise rotation of wobble or stop plate 32 about pin 37. Conversely, the contraction of jack 25 will downwardly displace cylinder 26 and cause the counterclockwise rotation of wobble plate 32. To prevent excessive travel of the jack cylinder 26 stop plate 32 has formed on it two stop faces 115 and 116 which are adapted to contact flat-sided, generally spherical stops 117 and 118 which are mounted in recesses in fitting 34. For example, the clockwise rotation of stop plate 32 about pin 37 brings stop face 115 into contact with stop 117 while the counterclockwise rotation of stop plate 32 brings stop face 116 into contact with stop 118. In addition to limiting the amount of displacement permitted the cylinder 26 of pneumatic jack 25 the stop faces 115 and 116 also serve to transmit loads borne by the jack 25 into the structure of the airplane, through the intermediation of stops 117 and 118 and fitting 34.

Thus, the support of the pneumatic jack 25 through the stop plate 32, and the cooperation of the latter with the stops 117 and 118 characterizes a "lost motion" means by which the pneumatic jack 25 is connected between the oleo strut 11 and the structure of the airplane.

The upper portion of the oleo strut 11 has embodied therein an automatic, safety down-latch mechanism 40 which is mounted in the extreme upper end of oleo cylinder 12, which has an annular land 41 formed in the interior thereof. Projecting from the upper end of the cylinder and retained therein by its contact with annular land 41 is a latch mounting or supporting means 42 which forms a closure for the upper end of the cylinder and provides a cylindrical bore 43 in which is pressed a bearing 44 formed of brass or similar material. About the periphery of the latch mounting means 42 and immediately adjacent the point at which it protrudes from the cylinder are formed threads 45 which are adapted to receive a threaded retainer or nut 46 which serves to keep the lower portion of latch supporting member 42 securely seated on annular land 41 and prevents it from being displaced from its position at the upper end of cylinder 12. An O-ring packing or seal 47 located in an annular groove cut into the periphery of the latch supporting member 42 serves to prevent passage of fluid or air between the latch supporting member and the inner wall of cylinder 12. A snap ring 48 is seated in a circumferential groove in the latch supporting member immediately adjacent the extreme upper end of the bearing 44 to prevent the inadvertent upward displacement of the bearing.

The annular bore 43 formed in the center of latch mounting or supporting means 42 is terminated by a transverse base portion 49 which is integrally formed with the side walls of the latch supporting means. An upwardly projecting, frusto-conical boss or guide means 50 is formed on the upper face of base portion 49 in the center of said base portion. Through the center of the frusto-conical boss or guide means 50 passes a hole 51 in which is positioned an elongated, hollow pin 52 which has integrally formed on its outer surface at substantially the midpoint thereof a projecting, annular bead 53 which is adapted to seat on the top of the frusto-conical boss 50 and prevent the pin from being downwardly displaced from the hole 51 into the interior of the oleo strut 11. A seal or O-ring 51a positioned in the frusto-conical boss 50 impinges on the surface of the pin 52 and prevents the leakage of air or oil through the hole 51 about the pin 52.

Positioned within the bore 43 and riding on bearing 44 is a cylindrical, hollow, hat-shaped down-latch member 54 which has formed at its extreme lower end an annular flange 55 which seats against the base portion of bearing 44 and prevents the upward displacement of latch means 54 beyond pre-determined limits. Positioned within the hollow interior of the latch member and being adapted to expand it into the extended position is a compression spring 56 which surrounds the hollow pin 52 and is seated on base portion 49 of latch mounting or supporting means 42 about the upwardly projecting boss 50. Welded or otherwise secured to the base portion 49 of latch mounting 42 and communicating with the interior of the hollow pin 52 is a cylindrical member 57 which serves as an air pressure and shock absorbing fluid channel or conduit adapted to convey said air pressure and fluid into the interior of said hollow pin 52 to cause it to serve as a force-transmitting means against the down-latch member 54 and vary the pressure against it in response to movement of the piston 13a. Conduit 57 is terminated by a base portion 57a which has an orifice therein through which air and fluid under pressure can be forced by piston 13a causing hollow pin 52 to force down-latch member 54 upward. As thus described, the oil and air within the oleo 11 constitute a shock-absorbing medium providing an operative connection between the piston 13a and the down-latch means 54.

Supported on the structure of the airplane and depending downwardly therefrom is a receptacle casting or pad 58 which consists of a U-shaped central portion 59 which is adapted to receive and guide the upper portion 60 of the latch supporting member 42 and which also serves to limit the forward travel of said latch supporting member 42 and its associated oleo strut when said oleo strut is subject to longitudinal loads. Integrally formed with the U-shaped central portion 59 and extending laterally therefrom on either side thereof are T-shaped stress bearing elements 63 which are secured to the aircraft structure. Extending forward from and integrally formed with the U-shaped central portion of the pad 58 are two T-shaped stress bearing members 64 which have interposed therebetween the leg of a T-shaped member 65 which extends beyond the ends of the L-shaped members 64. Located in the center of the U-shaped central portion 59 of the receptacle 58 is a circular recess 66 which has an annular groove cut in its lower edge adapted to receive a bronze or brass insert or collar 67.

As shown in Figure 2, down-latch member 54 is adapted to be received within recess 66 and to be maintained therein by the combined expansive forces of spring 56 and hollow expansion pin 52. As can be seen from the phantom showing of Figure 2 the down-latch member 54 is always in its extended position and is maintained in that position by means of the expansive force of the spring 56 and the pressure of compressed air within the oleo strut 11 which is communicated to the interior of hollow pin 52 through cylindrical member 57 which communicates with the lower portion of the interior of the oleo strut. Thus when the oleo strut 11 is rotated about pivot point 8 from the retracted to the extended position by the action of pneumatic jack 25 the down-latch member 54 must be depressed by the contact of its top 68, which is formed on a radius, with the collar 67 and when the down-latch member 54 is accurately centered with the circular recess 66 the down-latch member 54 is expanded into the recess by the expansive forces discussed above. Therefore, the action of the down-latch member 54 is automatic and is not dependent upon the operation of any associated mechanism to cause it to retract and expand, other than the expansion spring 56 and the normal force of the compressed air within oleo strut 11 on pin 52.

It is obvious that once down-latch member 54 is securely seated in recess 66 release means must be provided which are capable of overriding the expansive forces of spring 56 and pin 52 in order to permit the ejection of the down-latch member 54 from recess 66, when the retraction of the extended landing gear is desired. Such means is provided in a lever arm 70 which is pivotally mounted on wobble or stop plate 32 by means of pin 33 and on lobe 35 of fitting 34 by means of pin 37. As previously indicated, pin 33 secures wobble plate 32 between the arms 31 of a clevis 30 formed on the end of pneumatic jack 25. Wobble or stop plate 32 is also secured to fitting 34 by means of pin 37. Any movement in the cylinder 26 of pneumatic jack 25 will be communicated to pivotally mounted wobble or stop plate 32 since wobble plate 32 is the means by which the upper end of cylinder 26 is connected to the aircraft structure. For example, the contraction of the pneumatic jack 25 in order to retract the landing gear will cause the downward displacement of cylinder 26 with the attendant counterclockwise rotation of wobble plate 32, said rotation being communicated to lever arm 70 which rotates simultaneously on pin 37 in a counterclockwise direction. Conversely, the expansion of pneumatic jack 25 in order to extend the landing gear will cause the upward displacement of cylinder 26 causing the clockwise rotation of both wobble or stop plate 32 and lever 70 on pin 37. Pivotally attached to the upper end of lever 70 as by a pin is a push rod 71 which extends aft to a lever arm 72 to which it is pivotally connected by means of bolt and nut or similar fastening means 73.

Lever arm 72 is fixed, as by brazing, on one end of a rotatable shaft 74 which is mounted in a bore cut, or otherwise fashioned, in receptacle 58, immediately forward of U-shaped portion 59. Shaft 74 is retained within the bore by means of a nut 76 which prevents its lateral displacement therefrom. A transverse cut 77 across the axis of the bore penetrates the upper portion of the bore and permits the insertion therein of an arm 78 which has a lobular portion 79 having pressed or otherwise formed therein spline ways 80 adapted to receive spline keys 83 formed on the periphery of shaft 74 where it underlies cut 77. Thus the arm 78 may be non-rotatably mounted on shaft 74 by passing the spline keys 83 through spline ways 80 in lobular portion 79 of lever arm 78.

Recess 66 has formed in the roof thereof an opening 81 through which arm 78 is adapted to impinge on the arcuate upper surface 68 of down-latch member 54. The outer end of arm 78 has formed therein a fork 84 in which is mounted a roller 85. Roller 85 impinges on the arcuate upper surface of down-latch member 54. Therefore, in retracting the extended gear, only when the aircraft has become airborne, the contraction of pneumatic jack 25 will cause the downward displacement of cylinder 26 with the attendant counterclockwise rotation of wobble plate 32 and lever 70 thus displacing push rod 71 forward, pulling lever arm 72 upward and causing the clockwise rotation of shaft 74. Arm 78 is thus depressed, forcing roller 85 against down-latch member 54 and permitting the withdrawal of the upper portion 60 of latch supporting member 42 from the confines of U-shaped central portion 59 of receptacle 58.

Projecting into the recess 66 in pad 58 at a point opposite the entry of arm 78 into said recess is tongue 86 of a limit switch 87. When the down-latch member 54 is seated in the recess 66 it contacts tongue 86 and cuts the circuit to a solenoid actuated valve 90 thus shutting off the flow of air to pneumatic jack 25.

Formed integrally with the forward portion of piston rod 13 are two projecting bosses 91 which have rotatably mounted therebetween an up-latch roller 91a which is adapted to be received in a scissors up-latch mechanism 92 mounted on plate 38. Up-latch mechanism 92 consists of oppositely disposed blades 93 which are biased into the open position by means of springs 94. Integrally formed with blades 93 are overlying wedge-shaped prongs 95 which the roller impinges upon as it passes between the blades, forcing the prongs apart and the blades closed. As the blades are forced together a pin (not shown) is dropped between their root ends to secure them in the closed position and lock the landing gear in the retracted position. In order to release the up-latch roller 91a to permit the extension of the landing gear there is provided an up-latch releasing linkage which consists of a push rod 96 pivotally mounted to the lower end of lever 70. The push rod 96 is pivotally connected to a lever 97 which is adapted to rotate about a pivot point 98 and which is connected to a pin (not shown) which locks the blades 93 of the up-latch mechanism together. Thus, when the pneumatic jack 25 is actuated in order to extend the landing gear, cylinder 26 is displaced in an upward direction, causing lever 70 to rotate in a clockwise direction, pulling push rod 96 upward and removing the pin (not shown) from its position between the root ends of blades 93. Simultaneously arm 78 which has been depressed into recess 66 with the retraction of the landing gear is withdrawn from recess 66, by the clockwise movement of lever 70 which displaces push rod 71 aft, pushing lever arm 72 down and causing the counterclockwise movement of shaft 74 to withdraw arm 78 and its associated roller out of recess 66 to permit the unhindered ingress of down-latch member 54 into the recess 66.

Located between bosses 91 below the roller 91a is a tongue 99 which is adapted to contact a limit switch 100 located on mounting plate 38 at a point contiguous to up-latch mechanism 92. The completion of the retraction of the landing gear by the locking of the up-latch roller 91a within up-latch mechanism 92 brings tongue 99 into contact with limit switch 100 causing the flow of air to pneumatic jack 25 to be cut off. A limit switch 101 positioned on oleo cylinder 12 immediately below arm 16 of scissors linkage 15 is adapted to prevent the retraction of the gear should the scissors linkage 15 be in the compressed position (as shown in Figure 1) which it assumes when the landing gear is on the ground. It is conceivable that binding forces present in the piston-cylinder combination might retard the normal extension of the piston 13 from the cylinder 12. If the gear were to be retracted before such extension were accomplished the improper position of wheel assembly 14 could cause considerable damage to the aircraft structure proper. Therefore, until the scissors linkage 15 is extended and the underside of arm 16 contacts limit switch 101 to close the circuit which permits air to flow to pneumatic jack 25, the gear cannot be retracted.

Shown in Figures 4, 5, 6 is the solenoid actuated pneumatic valve 90 which controls the flow of air to the pneumatic jack 25. Two solenoids 102 and 103 control the movement of valve members 104 and 105. Inlet port 106 brings compressed air into the valve from a source (not shown) and an oppositely positioned exhaust port 107 permits the exhaust of air therefrom. Ports 108 and 109 permit air to be carried from or returned to valve 90 through associated lines 110 and 111 which communicate with cylinder 26 of pneumatic jack 25 at either end thereof.

In Figure 4 the solenoid actuated valve is shown with solenoid 102 energized to permit the flow of compressed air into entry port 106 through port 108, line 110 and into the upper or left portion of cylinder 26 of pneumatic jack 25, causing the piston 27 to be moved to the right or bottom portion of the cylinder 26 and exhausting air through line 111, port 109, and into the atmosphere through valve exhaust port 107. The movement of piston 27 in cylinder 26 extends landing gear 10. When down-latch member 54 seats in recess 66 and contacts the tongue 86 of limit switch 87 it de-energizes solenoid 102 and throws valve 90 into the neutral or static position, as shown in Figure 5. In this position solenoids 102 and 103 are both de-energized, valve members 104 and 105 are so positioned as to prevent the flow of air from either port 108 or 109 into cylinder 26 and any air on either side of piston 27 may exhaust into atmosphere through line 110 and associated port 108 and line 111 and associated port 105 and out of valve 90 through port 107. It is to be understood that the valve 90 will assume the neutral or static position when the gear 10 is in either its fully extended or fully retracted position since down-latch member and associated receptacle 58 maintain the gear in its extended position and up-latch assembly 92 in conjunction with up-latch roller 91a hold the gear in its retracted position.

To accomplish the retraction of the gear 10 solenoid 103 is energized, permitting compressed air to flow into valve 90 by means of entry port 106, out of valve 90 through port 109 and through line 111 into the lower or right hand side of cylinder 26, causing the piston 27 to be moved to the upper or left hand part of the cylinder 26 to retract the gear through the piston rod 28. Simultaneously air is exhausted into atmosphere from the left hand side of the cylinder 26 through line 110, port 108 and exhaust port 107.

The outstanding feature of the landing gear as a whole lies in the fact that once the gear has been extended and the down-latch member 54 is seated in recess 66 the landing gear cannot be retracted in any way since the weight of the aircraft on the gear so forces the piston rod 13 into cylinder 12 that a pressure of approximately 800 p. s. i. is generated. This pressure is fed from the lower portion of cylinder 12 through conduit 57 and into the interior of hollow pin 52 which is forced against the interior of down-latch member 54 seating it with such force in recess 66 that unlatching arm 78 and its associated roller 85 cannot possibly unseat down-latch 54 from recess 66 and cause the inadvertent retraction of the gear 10 with the consequent disastrous collapse of the gear. As explained previously, the down-latch member 54 is normally expanded into the extended position by the combined force of the spring 56 and the normal pressure of approximately 300 p. s. i. which exists in the cylinder 12 when the gear is not in contact with the ground. In this way, the down-latch member 54 may be depressed when it contacts the collar 67 upon the extension of gear 10 when the aircraft is in flight, prior to the seating of down-latch member 54 within the recess 66. Once upon the ground however, the weight of the aircraft upon the gear more than doubles the pressure within cylinder 12, driving the pin 52 against down-latch member 54 with such force that its seat within recess 66 could not conceivably be dislodged while the aircraft was on the ground. There is thus provided down-latch means for aircraft landing gear of such a nature that the landing gear on which said down-latch means is incorporated automatically drives said down-latch means into an engagement which could be broken on the ground only by failure of the intrinsic structure of the landing gear itself. Since the pin 52 which secures the down-latch mechanism 54 within recess 66 while the aircraft in which it is incorporated is on the ground is actuated by the pressure within the shock absorbing oleo strut 11 itself it is a completely autonomous and automatic mechanism and failure of any other portion of the landing gear actuating mechanism would not, in any way, influence the functioning of the down-latch member 54.

Also of note in the construction and actuation of the gear 10 is its pivotal suspension on boss 22 by bolt or similar fastening means 8. Thus, unlike conventional landing gear the strut is supported for rotation at only one point and such linkages as drag struts are eliminated. As can be seen from the drawings, the point of suspension of the landing gear is forward of the center of gravity of the gear itself. Therefore, should damage to the pneumatic jack 25 prevent the powered extension of the gear, the up-latch mechanism 92 could be manually released and the gear dropped. Aerodynamic drag and the frictional contact of the gear with the ground would then be sufficient to throw it into the extended and locked position. This method of suspension is, in itself, a valuable safety feature which supplements the effectiveness of the automatic down-latch mechanism described above.

It is apparent that there has been described in the specification and shown in the drawings a preferred embodiment of the invention which has been utilized for the purpose of illustrating the manner of construction and mode of operation of the present invention and it is obvious that changes could be made in details of construction which would yet fall within the scope of the appended claims.

We claim:

1. A shock absorber for an aircraft landing gear comprising a cylinder, piston means slidable in the cylinder, down-latch means mounted on said cylinder, a shock absorbing medium contained in said cylinder forming an operative connection between the piston means and the down-latch means whereby pressure on said down-latch means is varied in response to movement of said piston means, and ground contacting means having an operative connection with said piston means for effecting movement thereof.

2. A shock absorber for an aircraft landing gear comprising a cylinder, piston means slidable in the cylinder, down-latch means mounted on said cylinder, force transmitting means communicating with the interior of said cylinder and engaging said down-latch means, a shock absorbing medium contained in said cylinder forming an operative connection between the piston means and the force-transmitting means whereby pressure on said down-latch means is varied in response to movement of said piston means, and ground contacting means having an operative connection with said piston means for effecting movement thereof.

3. A shock absorber for an aircraft landing gear comprising a cylinder, piston means slidable in the cylinder, down-latch means incorporated in said cylinder, mounting means secured to said cylinder adapted to support said down-latch means, force-transmitting means communicating with the interior of said cylinder and engaging said down-latch means, a shock absorbing medium contained in said cylinder forming an operative connection between the piston means and the force-transmitting means whereby pressure on said down-latch means is varied in response to movement of said piston means, and ground contacting means having an operative connection with said piston means for effecting movement thereof.

4. A shock absorber for an aircraft landing gear comprising a cylinder, piston means slidable in the cylinder, down-latch means mounted on said cylinder on the pressure side of said piston means, force-transmitting means communicating with the interior of said cylinder engaging said down-latch means, a shock absorbing medium contained in said cylinder forming an operative connection between the piston means and the force-transmitting means whereby pressure on said down-latch means is varied in response to movement of said piston means, and ground contacting means having an operative connection with said piston means for effective movement thereof.

5. A shock absorber for an aircraft landing gear comprising a cylinder, piston means slidable in the cylinder, down-latch means incorporated in said cylinder, mounting means secured to said cylinder on the pressure side of said piston means supporting said down-latch means, expansion means in said mounting means communicating with said cylinder and engaging said down-latch means, a shock absorbing medium contained in said cylinder forming an operative connection between the piston means and the force-transmitting means whereby pressure on said down-latch means is varied in response to movement of said piston means, and ground contacting means operatively connected with said piston means for effecting movement thereof.

6. A shock absorber for an aircraft landing gear comprising a cylinder, piston means slidable in the cylinder, down-latch means incorporated in said cylinder, mounting means secured to said cylinder on the pressure side of said piston supporting said down-latch means, slideable force-transmitting means mounted in said mounting means extending into said cylinder and engaging said down-latch means, a shock absorbing medium contained in said cylinder forming an operative connection between said piston means and said force-transmitting means whereby pressure on said down-latch means is varied in response to movement of said piston means, and ground contacting means operatively connected with said piston means for effecting movement thereof.

7. A shock absorber for an aircraft landing gear comprising a cylinder, piston means slidable in the cylinder, down-latch means mounted on said cylinder, mounting means secured to said cylinder supporting said down-latch means, spring means supported upon said mounting means urging said down-latch means into its extended position, and force-transmitting means communicating with said cylinder and engaging said down-latch means to form an operative means to cooperate with said spring whereby the pressure tending to urge said down-latch means into its extended position is responsive to the pressure variation in said cylinder resulting from movement of said piston means.

8. A shock absorber for an aircraft landing gear comprising a cylinder, a piston slidable therein, down-latch means on said cylinder, mounting means secured to said cylinder supporting said down-latch means, shock-absorbing medium within said cylinder forming an operative connection between said piston and said down-latch means whereby the pressure applied to said down-latch means is varied in response to movement of said piston, and ground engaging means operatively connected to said piston.

9. A shock absorber for an aircraft landing gear comprising a cylinder, a piston slidable therein, down-latch means on said cylinder, mounting means secured to said cylinder supporting said down-latch means, expansion means normally urging said down-latch means into latched position, a shock-absorbing medium within said cylinder forming an operative connection between said piston and said down-latch means whereby the pressure applied to said down-latch means is varied in response to movement of said piston, and ground engaging means operatively connected to said piston.

10. A shock absorber for an aircraft landing gear comprising a cylinder, a piston slidable therein, down-latch means on said cylinder, mounting means secured to said cylinder supporting said down-latch means, a hollow pin having a closed end bearing against said down latch means and being slidably mounted in said mounting means with an open end in communication with said cylinder on the pressure side of said piston, a shock-absorbing medium within said cylinder forming an operative connection between said piston and the open end of said hollow pin whereby the pressure applied to said down-latch is varied in response to movement of said piston, and ground engaging means operatively connected to said piston.

11. In a retractable landing gear for aircraft, a rotatable shock strut having its pivot spaced from and below the upper end thereof, said shock strut comprising a cylinder, a piston slidable therein, a ground engaging member operatively connected to said piston, and down-latch means carried by and adjacent the upper end thereof, a receptacle on said aircraft adapted to receive said down-latch means to lock said shock strut against rotation when said landing gear is in an operative position, and a shock absorbing medium in said cylinder forming an operative connection between said piston and said down-latch means to control the operation thereof.

12. In a retractable landing gear for aircraft, a rotatable shock strut having its pivot spaced from and below the upper end thereof, said shock strut comprising a cylinder, a piston slidable therein, a ground engaging member operatively connected to said piston, and down-latch means carried by and adjacent the upper end thereof, retracting means operatively connected to said shock strut and to said airplane, a receptacle on said aircraft adapted to receive said down-latch means to lock said shock strut against rotation when said landing gear is in an operative position, and a shock absorbing medium in said cylinder forming an operative connection between said piston and said down-latch means to control the operation thereof.

13. In a retractable landing gear for aircraft, a rotatable shock strut having its pivot spaced from and below the upper end thereof, said shock strut comprising a cylinder, a piston slidable therein, a ground engaging member operatively connected to said piston, and down-latch means carried by and adjacent the upper end thereof, fluid operable retracting means operatively connected to said shock strut and to said airplane, a receptacle on said aircraft adapted to receive said down-latch means to lock said shock strut against rotation when said landing gear is in an operative position, and a shock absorbing medium in said cylinder forming an operative connection between said piston and said down-latch means to control the operation thereof.

14. In a retractable landing gear for aircraft, rotatable shock strut having its pivot spaced from and below the upper end thereof, said shock strut comprising a cylinder, a piston slidable therein, a ground engaging member operatively connected to said piston and down latch means carried by and adjacent the upper end thereof, retracting means operatively connected to said shock strut and to said airplane, a receptacle on said aircraft adapted to receive said down-latch means to lock said shock strut against rotation when said landing gear is in an operative position, means on said airplane operable to disengage said down-latch from said receptacle, and a shock absorbing medium in said cylinder forming an operative connection between said piston and said down-latch means to prevent operation of said disengaging means when the aircraft is partially supported by said ground engaging member.

15. In a retractable landing gear for aircraft, rotatable shock strut having its pivot spaced from and below the upper end thereof, said shock strut comprising a cylinder, a piston slidable therein, a ground engaging member operatively connected to said piston, and down-latch means carried by and adjacent the upper end thereof, retracting means operatively connected to said shock strut and to said airplane, a receptacle on said aircraft adapted to receive said down-latch means to lock said shock strut against rotation when said landing gear is in an operative position, means on said airplane to disengage said down-latch from said receptacle, having an inter-connection with said retracting means whereby operation thereof is preceded by operation of said disengaging means, and a shock absorbing medium in said cylinder forming an operative connection between said piston and said down-latch means to prevent operation of said disengaging means and said retracting means when the aircraft is partially supported by said ground engaging member.

16. In a retractable landing gear for aircraft, a rotatable shock strut having its pivot spaced from and below the upper end thereof, said shock strut comprising a cylinder, a piston slidable therein, a ground engaging member operatively connected to said piston, and down-latch means carried by and adjacent the upper end thereof, a pneumatic jack operatively connected to said shock strut and to said aircraft to rotate said shock strut to a retracted position, a receptacle on said aircraft adapted to receive said down-latch means to lock said shock strut against rotation when said landing gear is in an operative position, a lever associated with said receptacle operable to disengage said down-latch from said receptacle, and a shock absorbing medium in said cylinder forming an operative connection between said piston and said down-latch means to prevent operation of said lever to disengage said down-latch means when the aircraft is partially supported by said ground engaging member.

17. In a retractable landing gear for aircraft, a rotatable shock strut having its pivot spaced from and below the upper end thereof, said shock strut comprising a cylinder, a piston slidable therein, a ground engaging member operatively connected to said piston, and down-latch means carried by and adjacent the upper end thereof, a pneumatic jack operatively connected to said shock strut and to said aircraft to rotate said shock strut to a retracted position, a receptacle on said aircraft adapted to receive said down-latch means to lock said shock strut against rotation when said landing gear is in an operative position, a lever associated with said receptacle operable to disengage said down-latch from said receptacle having an inter-connection with said pneumatic jack whereby operation of said jack to retract said shock strut is preceded by operation of said lever to disengage said down-latch means, and a shock absorbing medium in said cylinder forming an operative connection between said piston and said down-latch means to prevent operation of said lever to disengage said down-latch means and the operation of said pneumatic jack when the aircraft is partially supported by said ground engaging member.

18. In a retractable landing gear for aircraft, a rotatable shock strut having its pivot spaced from and below the upper end thereof, said shock strut comprising a cylinder, a piston slidable therein, a ground engaging member operatively connected to said piston, and down-latch means carried by and adjacent the upper end thereof, a pneumatic jack having "lost motion" means associated therewith attached to said shock strut and to said aircraft to rotate said shock strut to a retracted position, a receptacle on said aircraft adapted to receive said down-latch means to lock said shock strut against rotation when said landing gear is in an operative position, unlocking means associated with said receptacle operable to disengage said down-latch means and an inter-connection between said inter-locking means and said pneumatic jack whereby operation of said pneumatic jack first causes operation of unlocking means during operation of said "lost motion" means and then retraction of said shock strut.

19. In a retractable landing gear for aircraft, a rotatable shock strut having its pivot spaced from and below the upper end thereof, said shock strut comprising a cylinder, a piston slidable therein, a ground engaging member operatively connected to said piston, and down-latch means carried by and adjacent the upper end thereof, a pneumatic jack having "lost motion" means associated therewith attached to said shock strut and to said aircraft to rotate said shock strut to a retracted position, a receptacle on said aircraft adapted to receive said down-latch means to lock said shock strut against rotation when said landing gear is in an operative position, unlocking means associated with said receptacle operable to disengage said down-latch means, an inter-connection between said inter-locking means and said pneumatic jack whereby operation of said pneumatic jack first causes operation of said unlocking means during operation of said "lost motion" means and then retraction of said shock strut, and a shock absorbing medium in said cylinder forming an operative connection between said piston and said down-latch means to prevent the operation of said unlocking means and said pneumatic jack when the aircraft is partially supported by said ground engaging member.

20. A shock absorber for an aircraft landing gear comprising a cylinder, piston means slidable in the cylinder, down-latch means mounted on said cylinder, mounting means secured to said cylinder adapted to support said down-latch means, spring means supported upon said mounting means urging said down-latch means into its extended position, elongated expansion means slidably maintained within said mounting means in communication with the interior of said cylinder and engaging said down-latch means, and a shock-absorbing medium contained in said cylinder forming an operative connection between said piston means and through said elongated expansion means to said down-latch means to move said down-latch means in response to movement of said piston.

HOWARD F. SCHMIDT.
PAUL L. BRADY.

REFERENCES CITED

The following references are of record in the file of this patent:

UNITED STATES PATENTS

| Number | Name | Date |
|---|---|---|
| 2,233,732 | Campbell | Mar. 4, 1941 |
| 2,321,065 | Burke | June 8, 1943 |
| 2,387,628 | Waseige | Oct. 23, 1945 |
| 2,427,885 | Turansky et al. | Sept. 23, 1947 |